US009261082B2

(12) United States Patent
Mazzullo et al.

(10) Patent No.: US 9,261,082 B2
(45) Date of Patent: Feb. 16, 2016

(54) DEVICE FOR SHIFTING ONE STRUCTURE WITH RESPECT TO ANOTHER

(71) Applicant: POWER LOGIC SOUTH AFRICA (PTY) LTD, Ottery (ZA)

(72) Inventors: Raymond Mazzullo, Constantia (ZA); Adrian Mazzullo, Noordehoek (ZA); Brian Van Zyl, Ottery (ZA); Bastian Strauf, Strand (ZA); Nicholas Brear, Ottery (ZA)

(73) Assignee: POWER LOGIC SOUTH AFRICA (PTY) LTD, Ottery (ZA)

( * ) Notice: Subject to any disclaimer, the term of this patent is extended or adjusted under 35 U.S.C. 154(b) by 0 days.

(21) Appl. No.: 14/303,281

(22) Filed: Jun. 12, 2014

(65) Prior Publication Data

US 2014/0367202 A1 Dec. 18, 2014

(30) Foreign Application Priority Data

Jun. 12, 2013 (ZA) ................................ 2013/04304

(51) Int. Cl.

*F03G 1/08* (2006.01)
*F03G 1/02* (2006.01)
*E05F 1/16* (2006.01)

(52) U.S. Cl.

CPC ... *F03G 1/02* (2013.01); *E05F 1/16* (2013.01); *E05Y 2201/484* (2013.01); *E05Y 2201/716* (2013.01); *E05Y 2201/722* (2013.01)

(58) Field of Classification Search

CPC .................................... F03G 1/00; F03G 1/08
USPC ...................................... 185/37, 39; 439/527
See application file for complete search history.

(56) References Cited

U.S. PATENT DOCUMENTS 3,693,759 A * 9/1972 Schindel .................... 185/40 R
2013/0316570 A1 11/2013 Mazzullo et al.

* cited by examiner

*Primary Examiner* — Phillip A Johnson
(74) *Attorney, Agent, or Firm* — Tarter Krinsky & Drogin LLP

(57) ABSTRACT

A device (10) for shifting one structure with respect to another, is disclosed. The device comprises a body (12) defining a cylinder, a core (14) within the cylinder and rotatable in the cylinder with respect to the body (12). A coil spring is connected between the body (12) and the core (14) and is wound or unwound as the core (14) is rotated in the cylinder. A compressible ring (48) is carried by the core (14) and is in frictional contact with the body. The ring (48) can be compressed by a nut (66) screwed onto a shaft (50) forming part of the core (14) so that the frictional resistance offered by the ring (48) to turning of the core (14) in the cylinder is increased.

9 Claims, 5 Drawing Sheets

10
24
26
68
60
12
70
72
68
68
56

DEVICE FOR SHIFTING ONE STRUCTURE WITH RESPECT TO ANOTHER

FIELD OF THE INVENTION

This invention relates to a device for shifting one structure with respect to another.

BACKGROUND TO THE INVENTION

There are many constructions which comprise a movable structure which is mounted on, and movable with respect to, a fixed structure. Springs and gas cylinders are conventionally used for displacing the movable structure in one direction with respect to the fixed structure after a latch is released. The potential energy of the spring or gas cylinder is expended during this movement. When the movable structure is manually displaced in the opposite direction with respect to the fixed structure, the spring is re-tensioned or the gas in the cylinder is recompressed. This provides the potential energy for the next movement of the movable structure.

The present invention provides a device which includes a spring, the device being for shifting a movable structure with respect to a fixed structure.

BRIEF DESCRIPTION OF THE INVENTION

According to the present invention there is provided a device for shifting one structure with respect to another, the device comprising a body defining a cylinder, a core within the cylinder and rotatable in the cylinder with respect to the body, and a coil spring connected between the body and the core and which is wound or unwound as the core is rotated in the cylinder, there being a compressible ring carried by one of the body and the core and in frictional contact with the other of the core and the body, and means for compressing said ring so that the frictional resistance offered by the ring to turning of the core in the cylinder is increased.

Said ring can be in a circumferentially extending open sided recess encircling said core, said core including an externally threaded shaft onto which a nut is screwed, one side of said nut being in contact with said ring whereby turning of the nut on the shaft moves the nut along the shaft to compress the ring.

The device preferably has means for releasably locking the body and the core to one another to prevent relative rotation of the body and core by the spring thereby permitting pre-tensioning of the spring.

Said core can further include a gear.

According to a further aspect of the present invention there is provided a socket box including a fixed structure and multiple electrical sockets mounted on a structure which can move with respect to said fixed structure, there being a device as defined in the preceding paragraph mounted on the movable structure with its gear in mesh with a rack of the fixed structure whereby rotation of said gear displaces said movable structure with respect to the fixed structure.

Said fixed structure can include two end plates each of which includes a rack and said movable structure can include a freely rotatable spindle with a gear wheel at each end thereof, said gear wheels being in mesh with said racks of the end plates, rotation of either gear wheel resulting in rotation of the other gear wheel.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
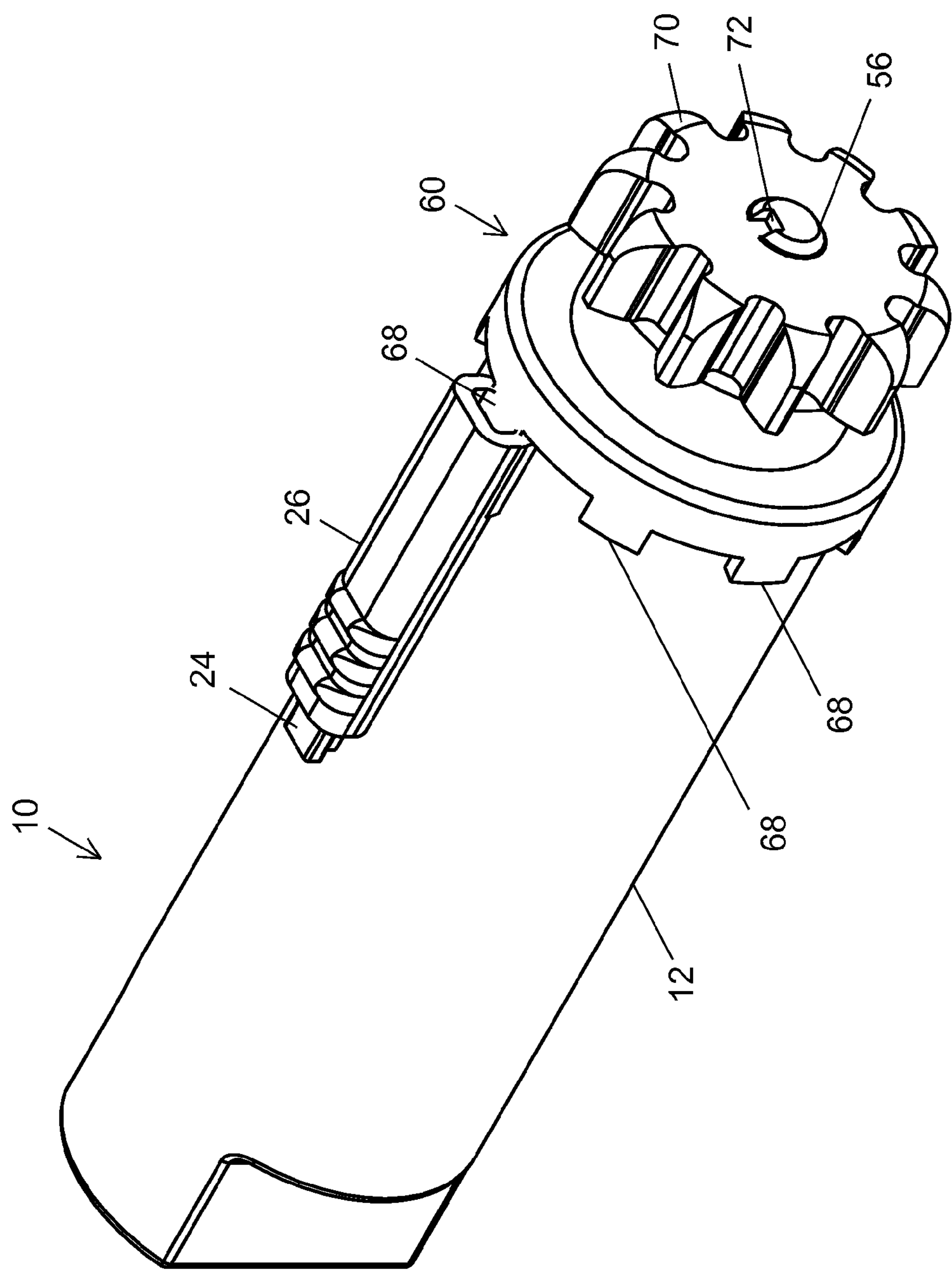
FIG. 1 is a pictorial view of a shifting device in accordance with the present invention.

The device illustrated in FIGS. 1 to 4 is designated 10 and comprises a moulded cylindrical, hollow body 12 which is open at one end. A rotatable core 14 fits in the hollow interior of the body 12 and closes off the open end of the body 12.

The body 12 comprises, internally, a cylindrical bounding wall 16 and a transverse end wall 18. A boss 20 stands proud of the end of wall 18. The boss 20 has a transverse slit 22 in it. Externally of the body 12 there is a longitudinally extending key 24 which is of T-shape. A slider 26 having a compatible shape fits on the key 24 and can be moved longitudinally along the body 12.

At its closed end the body 12 has two opposed flats 12.1 which facilitate mounting of the device 10.

The core 14 comprises a cylindrical sleeve 28 which fits in the cylinder constituted by the body 12. Externally the sleeve 28 has two circumferentially extending grooves 30, 32 which receive O-rings 34, 36. The sleeve also has, externally, two flats 38 which provide cavities that receive a "stiff" silicon grease for a purpose to be described. The O-rings 34, 36 seal between the wall 16 and the external cylindrical surface of the sleeve 28. At one end the sleeve 28 is closed by a transverse end wall 40. A boss 42, substantially identical to the boss 20, stands proud of the transverse wall 40 and faces the boss 20. The boss 42 has a slit 44 in it equivalent to the slit 22 of the boss 20.

A circumferentially extending recess 46 is provided in the wall 40, the recess 46 receiving an O-ring 48. A shaft 50 protrudes from the transverse end wall 40 in the opposite direction to the boss 42. A portion 52 of the shaft 50 is square in section and immediately adjacent this there is a threaded section 54. The end section 56 of the shaft 50 is cylindrical and includes a keyway 58.

The core 14 further includes an end cap 60 which has an internal square shaped socket 62 which fits the section 52 of the shaft 50. Adjacent the socket 62 the end cap 60 has a recess 64 for receiving a nut 66 which screws onto the section 54. The end cap 60 further has a plurality of axially extending fingers 68.

A gear 70 having an internal key 72 fits on the section 56 of the shaft 50.

A coil spring 74 contained within the sleeve 28 has its ends in the slits 22, 44 so that it is attached to the bosses 20 and 42.

The device is assembled by inserting the coil spring 74 into the body 12 until its diametrically extending end piece engages in the slit 22 of the boss 20. The spring is then stretched and other end piece of the spring 74 is engaged in the slit 44 of the boss 42. The sleeve 28, with the O-rings 34, 36 in the grooves 30, 32, with silicon grease in the flats 38, with the ring 48 in place and with the spring 74 attached, is then slid into the body 12.

Figure 2:
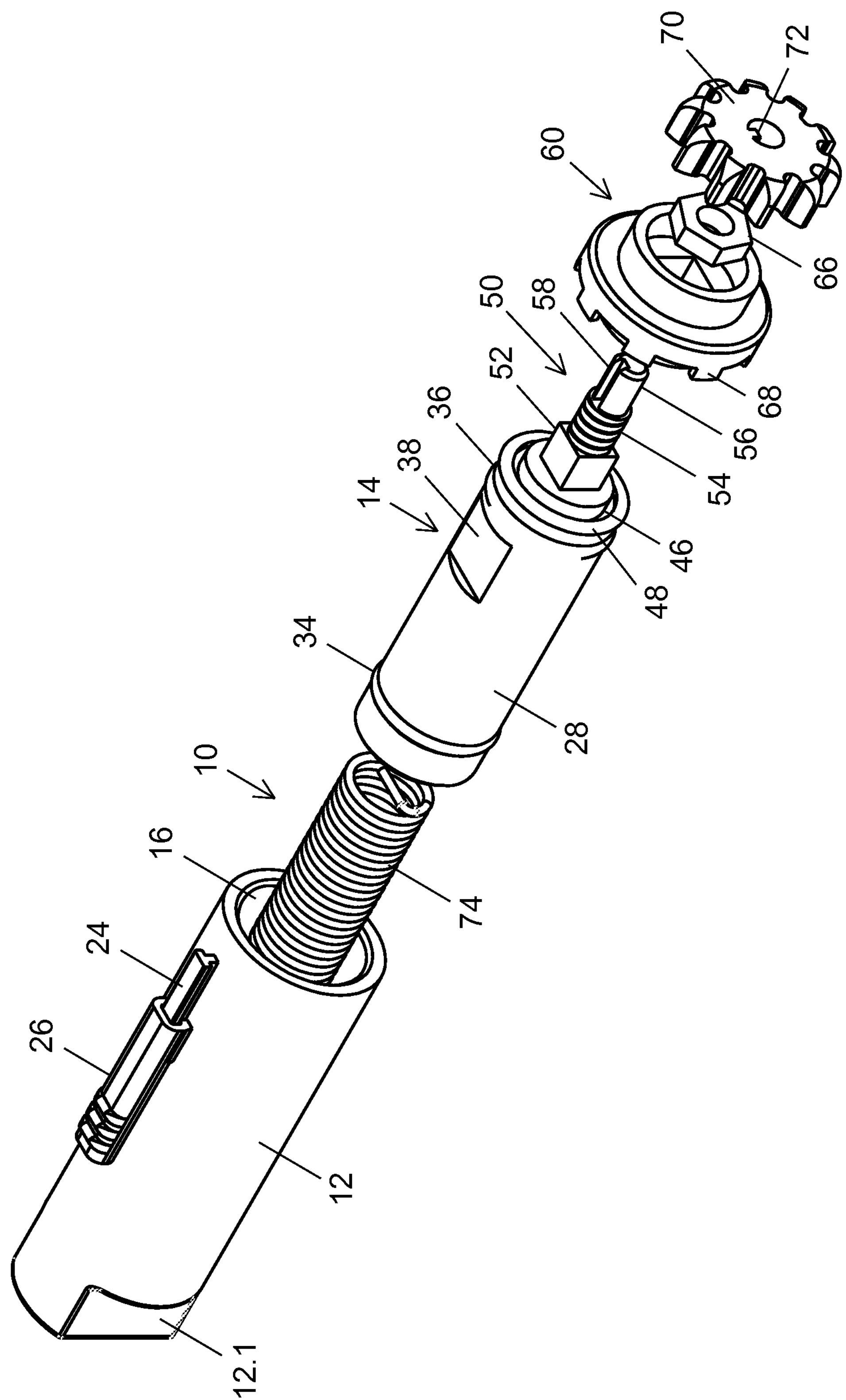
FIG. 2 is an "exploded" view of the device of FIG. 1.
Figures 3, 4:
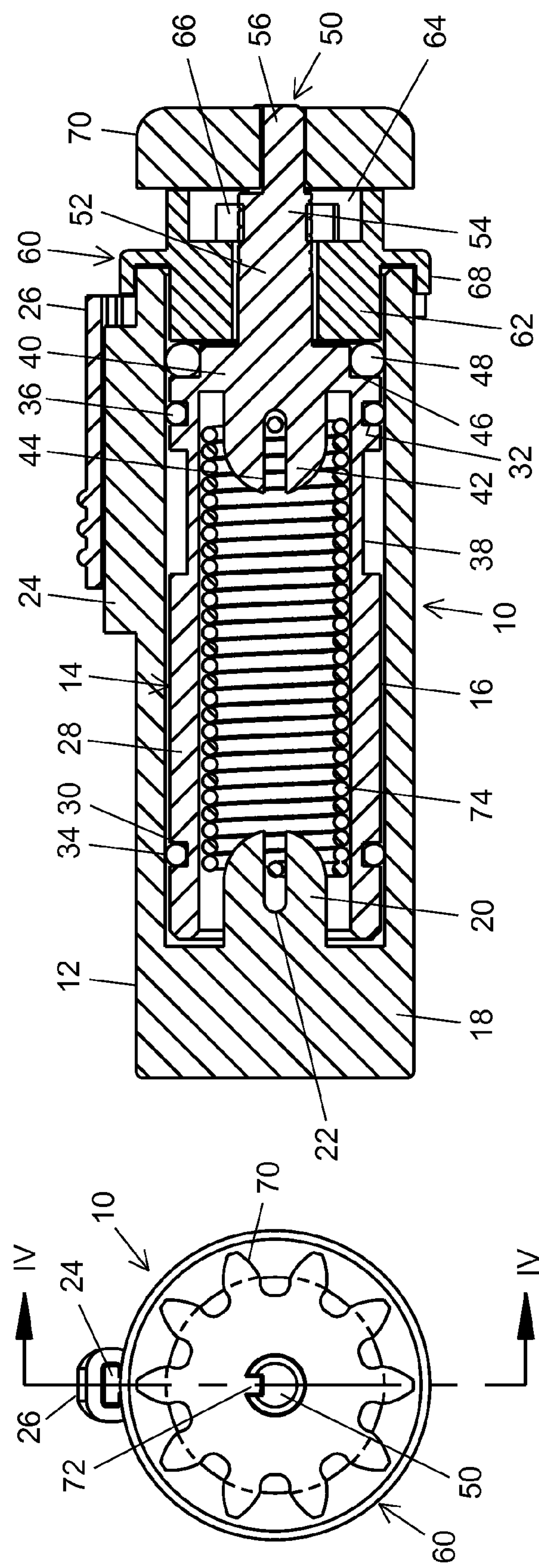
FIG. 3 is an end view of the device.
FIG. 4 is an axial section through the device on the line IV-IV of FIG. 3.

The slider 26 is retracted from the position shown in FIGS. 1 and 4 to the position shown in FIG. 2 where it is at the left-hand end of the key 24. The end cap 60 is then slid onto the shaft 50 so that the square section socket 62 engages the square section 52 of the shaft 50. The nut 66 is then screwed onto the section 54 so that the cap 60 is pressed against the O-ring 48 compressing it axially and expanding it radially.

The core 14 is rotated during assembly so that the spring 74 is wound and hence tensioned so that it exerts a force which tends to rotate the core 14 with respect to the body 12. Finally, if necessary the position of the cap 60 is adjusted slightly in the circumferential direction. The gap between two of the fingers 68 can be aligned with the key 24 and the slider 26 can then be moved to a position such that the slider moves between the selected fingers 68. Alternatively the key can, as illustrated in FIG. 1, be aligned with one of the fingers 68 and the slider can be slipped over the aligned finger 68. In both positions there is an interlock between the slider 26 and the fingers 68 and the cap 60 is consequently locked against rotary movement.

The gear 70 is then slid onto the section 56 so that the key 72 enters the keyway 58. There is a press fit between the gear 70 and section 56 so that the gear 70 is retained on the shaft 50.

The "stiff" silicon grease in the cavities formed by the flats 38 provides some resistance to turning of the core 14 in the body 12. The degree to which the O-ring 48 is compressed also provides a variable resistance to turning of the core 14 in the body 12. This resistance can be varied by removing the gear 70 and turning the nut 66 so as to exert more or less pressure on the O-ring 48. If the O-ring 48 is further compressed, the frictional resistance that is offered to turning of the sleeve 28 increases.

Figure 5:
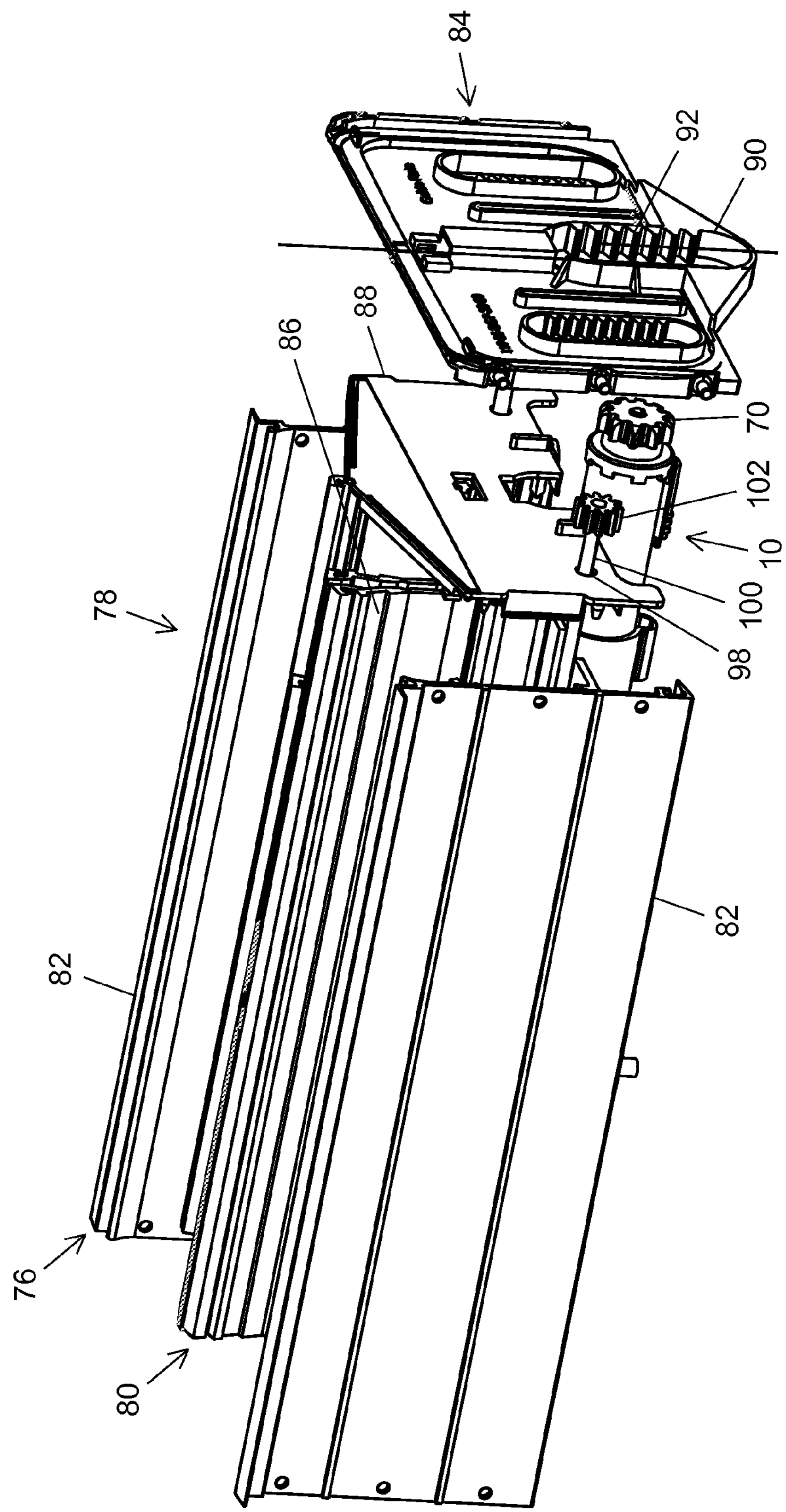
FIG. 5 is an "exploded" view of a socket box including the device of FIGS. 1 to 4.

FIG. 5 illustrates some of the components of a multi-socket box 76 of the type described in the specification of U.S. patent application Ser. No. 13/903,142 published as US-2013-0316570-A1. The socket box comprises a fixed structure generally designated 78 and a vertically movable structure generally designated 80.

The fixed structure 78 comprises two side plates 82 and two end plates 84. Only one of the end plates 84 is shown.

The movable structure 80 comprises a centre plate 86 and two end plates 88. Only one end plate 88 is shown.

Figure 6:
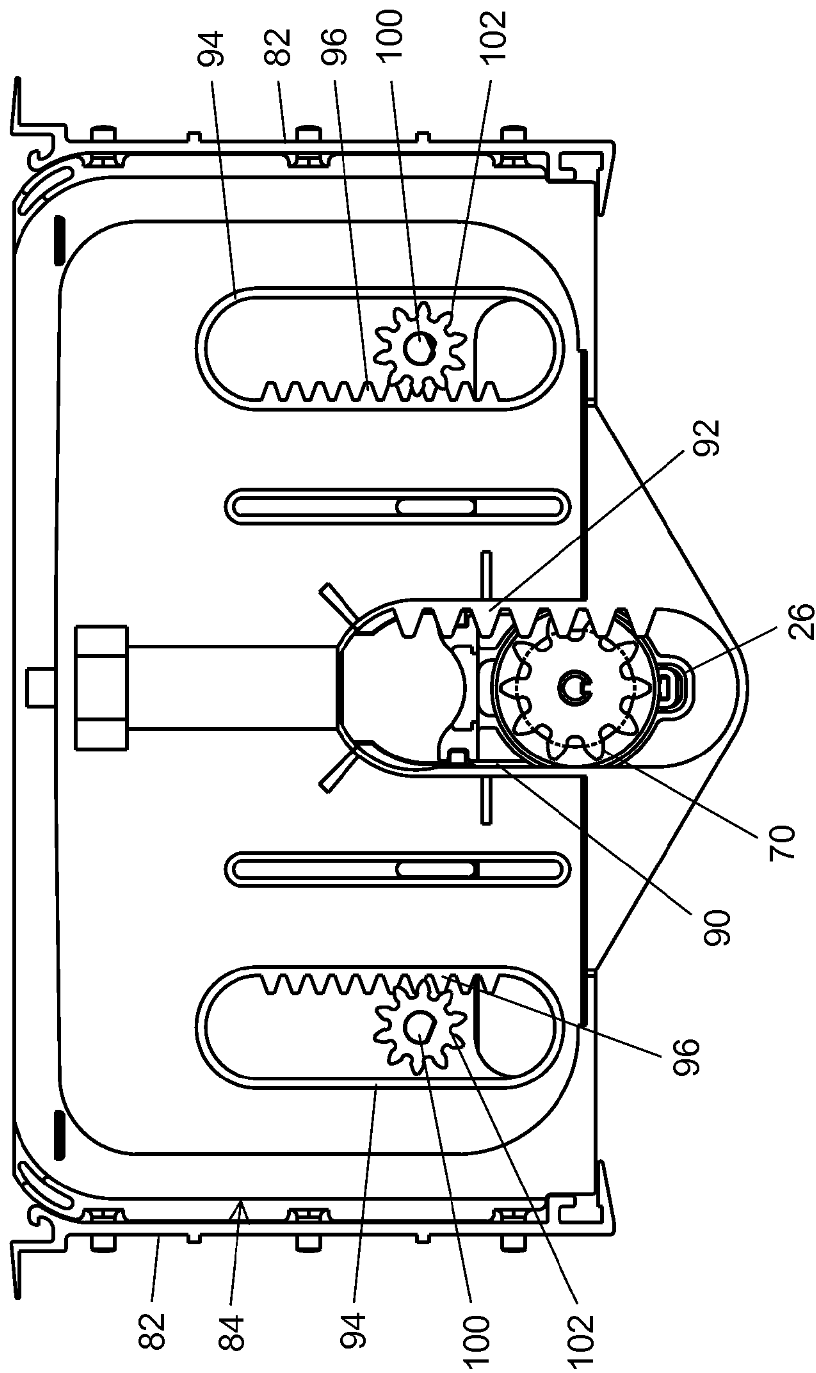
FIG. 6 is an end view of the socket box of FIG. 5.

The plate 84 has a vertical slot 90 in it (see particularly FIG. 6). One vertical edge of the slot 90 is constituted by a rack 92 the teeth of which are of a shape compatible with the teeth of the gear 70. On each side of the slot 90 there is a further vertical slot 94. One vertical edge of each further slot 94 is in the form of a rack 96.

Using the flats 12.1, the body 12 of the device 10 is mounted on the structure 80 in an orientation such that the slider 26 is on the underside of the body 12. The gear 70 is in the slot 90 and its teeth are in mesh with the teeth of the rack 92.

The end plate 88 has two circular openings 98 in it and spindles 100 pass through these openings and through corresponding openings in the plate 88 which has not been shown. A gear wheel 102 is provided on each end of each spindle 100. The gear wheels 102 are each in mesh with one of the racks 96.

When the structure 80 is in its lowermost position, the gear 70 and gear wheels 102 are in the lower parts of the slots 90 and 94 as is best seen in FIG. 6. The coil spring 74 is tensioned and exerting a force which tends to rotate the core 14 with respect to the body 12.

When a downward pressure is exerted on the movable structure 80, the latching mechanism described in the Specification of U.S. patent application Ser. No. 13/903,142 is released so that the movable structure 80 is free to move upwardly with respect to the fixed structure 78.

The coil spring 74 of the device 10 rotates the core 14 and hence the gear 70 so that the gear 70 moves up the rack 92 lifting the movable structure 80 with respect to the fixed structure 78. It will be understood that as soon the device 10 has been installed, the slider 26 is moved back to free the core 14 for rotation in the body 12. The racks 96 rotate the gear wheels 102 and the spindles 100 and hence the gear wheels 102 at the other ends of the spindles 100. The latter gears 102 as they rotate drive the other end plate 84 upwardly.

A second device 10 can be mounted in a corresponding position at the other end of the socket box 76. If two devices 10 are provided then the spindles 100 and gears 102 are operative to ensure that both ends of the structure move up evenly.

The spring 74 unwinds during upward movement of the structure 80. It is rewound when the structure 80 is pressed down to its lower position with respect to the structure 78.

The silicon grease between the body 12 and the core 14, and the frictional resistance offered by the O-ring 48, ensure that the structure 80 moves up at a controlled rate with respect to the structure 78.

The invention claimed is:

1. A device for shifting one structure with respect to another, the device comprising a body defining a cylinder, a core within the cylinder and rotatable in the cylinder with respect to the body, and a coil spring connected between the body and the core and which is wound or unwound as the core is rotated in the cylinder, there being a compressible ring carried by one of the body and the core and in frictional contact with the other of the core and the body, and means for compressing said ring so that the frictional resistance offered by the ring to turning of the core in the cylinder is increased.

2. The device as claimed in claim 1, wherein said ring is in a circumferentially extending open sided recess encircling said core, said core including an externally threaded shaft onto which a nut is screwed, one side of said nut being in contact with said ring whereby turning of the nut on the shaft moves the nut along the shaft to compress the ring.

3. The device as claimed in claim 2 and including means for releasably locking the body and the core to one another to prevent relative rotation of the body and core by the spring thereby permitting pre-tensioning of the spring.

4. The device as claimed in claim 2 wherein said core further includes a gear.

5. The device as claimed in claim 1 and including means for releasably locking the body and the core to one another to prevent relative rotation of the body and core by the spring thereby permitting pre-tensioning of the spring.

6. The device as claimed in claim 5 wherein said core further includes a gear.

7. The device as claimed in claim 1 wherein said core further includes a gear.

8. A socket box including a fixed structure and multiple electrical sockets mounted on a structure which can move with respect to said fixed structure, there being the device as defined in claim 7 mounted on the movable structure with the gear in mesh with at least one rack of the fixed structure whereby rotation of said gear displaces said movable structure with respect to the fixed structure.

9. The socket box as claimed in claim 8, wherein said fixed structure includes two end plates each of which includes a rack and said movable structure includes a freely rotatable spindle with a gear wheel at each end thereof, said gear wheels being in mesh with said racks of the end plates, rotation of either gear wheel resulting in rotation of the other gear wheel.

* * * * *